UNITED STATES PATENT OFFICE.

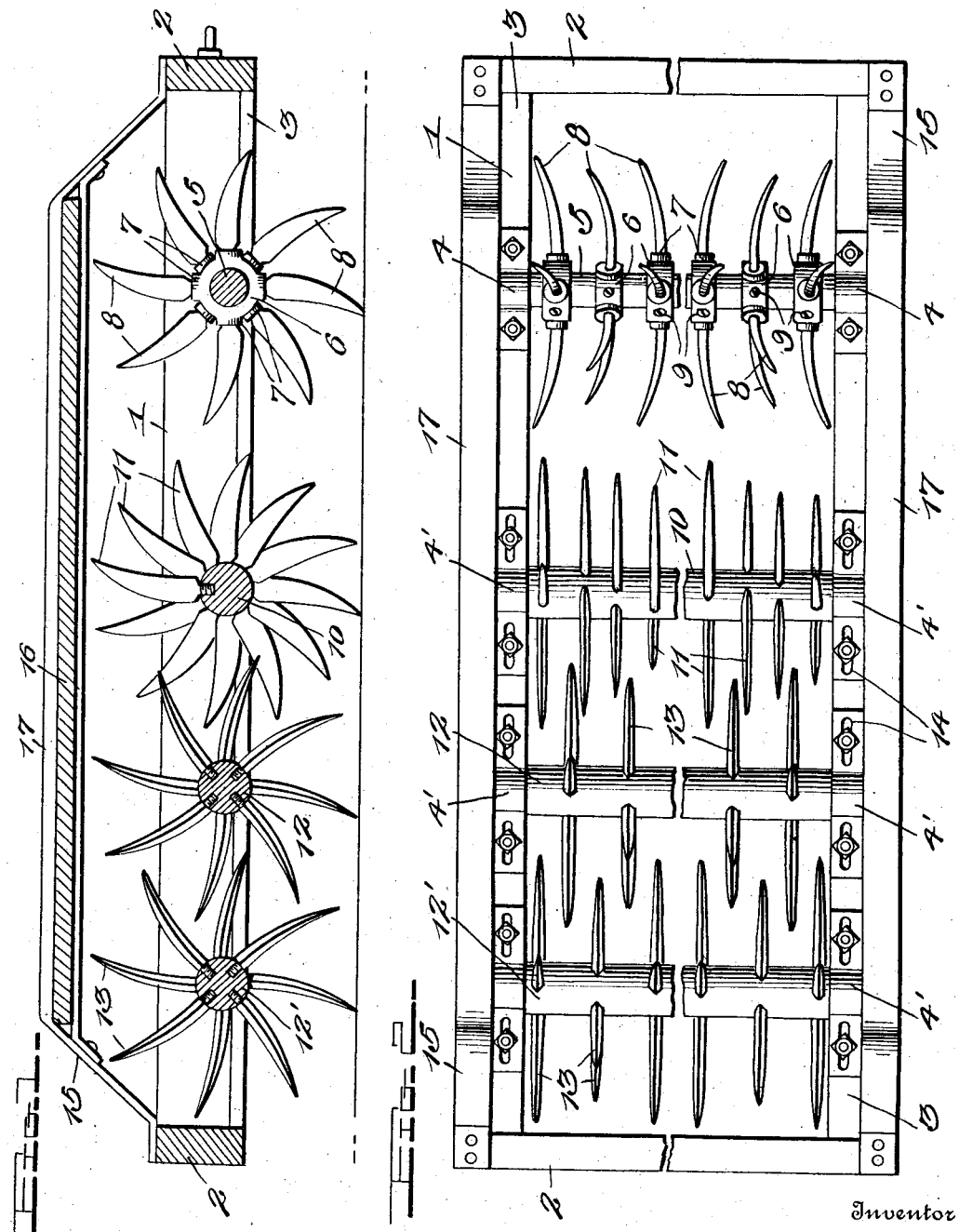

ALBERT LARSON, OF LAPINE, OREGON.

HARROW.

1,051,739. Specification of Letters Patent. Patented Jan. 28, 1913.

Application filed August 19, 1912. Serial No. 715,861.

*To all whom it may concern:*

Be it known that I, ALBERT LARSON, a citizen of the United States, residing at Lapine, in the county of Crook and State of Oregon, have invented certain new and useful Improvements in Harrows, of which the following is a specification, reference being had to the accompanying drawings.

This invention relates to new and useful improvements in harrows, the object of the invention being to provide a harrow frame in which is mounted a plurality of drums having harrow teeth secured thereto and a cover hinged to one side of the frame and upon which the frame is mounted when it is desired to transport the frame from place to place upon runners which constitute a part of the cover structure.

Another object of the invention is to provide a harrow of the above character which will possess advantages in points of efficiency and durability, is inexpensive to manufacture and at the same time is simple in construction and operation.

With the above and other objects in view the invention consists in the novel features of construction and the combination and arrangement of parts hereinafter more fully described, pointed out in the claims and shown in the accompanying drawings in which—

Figure 1 is a longitudinal sectional view. Fig. 2 is a top plan view, the cover being removed.

Referring more particularly to the drawings 1 indicates the frame of the harrow which comprises the longitudinal side bars suitably connected at their ends to the ends of the transverse end pieces 2. Secured to the under side of one of the longitudinal edges of the side pieces 1 are the supporting strips 3 upon the upper face of which are mounted the bearings 4 and 4'. Having its ends mounted in the bearings 4 is a roller 5 which is provided with a plurality of hubs 6 having radial outwardly extending portions 7 in which are mounted the inner ends of the cutting knives 8, said hubs being held securely in place upon the roller by means of the set screws 9. It will be readily apparent from the drawings that the hubs 6 are so arranged upon the roller that one half of the knife blades are curved toward one side of the frame while the other half of the knife blades are curved toward the opposite side of the frame, this arrangement of the knives pulling the harrow teeth into the ground so as to thoroughly loosen the soil. Arranged in the frame at the rear of the roller 5 is another roller 10, the ends of which are suitably mounted in the adjustable bearings 4'. Extending outwardly from the roller and having their ends suitably mounted therein are a plurality of radially projecting knives 11 which are arranged in rows upon the outer periphery of the roller, said rows being arranged in a spiral line around the roller so that the outer ends of the knives will not come in contact with the outer ends of the knives 8 upon the roller 5.

Mounted in the adjustable bearings 4' and arranged directly in the rear of the roller 10 are the spaced rollers 12 and 12' each being provided upon its outer periphery with a plurality of radially projecting teeth 13 which are arranged in the roller in alternate relation so that as the rollers revolve the teeth thereon will pass between each other. It will be noticed that the teeth 13 are pointed and are slightly curved so as to thoroughly pulverize the soil after the same has been cut into small pieces by the knives 8 and 11 and in this manner after the harrow has passed over the ground the soil will be thoroughly pulverized. It will be readily apparent that the bearings 4' which are provided upon each side thereof with the elongated slots 14, can be readily adjusted so that the roller mounted therein can be laterally adjusted according to the character of the ground upon which the harrow is to be worked. If the ground is hard and in lumps, the rollers are to be arranged closer together so as to thoroughly pulverize the soil, but in case the ground is moist and easy to handle, the rollers can be moved farther apart so that there will not be so much strain upon the draft animals.

Secured to the longitudinal side pieces by means of the members 15 is a suitable cover 16 adapted to be arranged over the upper side of the frame and upon which a suitable seat (not shown) for the driver may be located. Arranged in spaced parallel relation upon the top of the cover are the metallic runners 17 which, when the harrow is adapted to be transported from place to place will rest upon the ground, the harrow frame being mounted upon the cover so that the same may be easily transported. It will be understood that when the harrow is to be moved from place to place the cover and the harrow are thrown over so that the runners 17 will rest upon the ground, the harrow frame being adapted to rest upon the cover.

From the above description taken in connection with the accompanying drawings it will be readily apparent that I have provided a simple and durable harrow wherein the cutting teeth carried thereby are so arranged that any character of ground may be thoroughly pulverized and placed in condition for planting and the rollers upon which the cutting teeth are mounted may be laterally adjusted so as to adapt the harrow to various characters of ground.

While I have shown and described the preferred form of my invention it will be obvious that various changes in the details of construction and in the proportions may be resorted to for successively carrying my invention into practice without sacrificing any of the novel features or departing from the scope of the appended claims.

What I claim is:—

1. In a device of the character described, the combination of a frame, rollers rotatably mounted within said frame, a plurality of hubs mounted upon one of said rollers, a plurality of curved cutting blades mounted upon said hubs, a second roller mounted in the frame and in the rear of the first roller, said second roller being provided with a plurality of cutting knives arranged in rows, said rows being arranged in a spiral line around the outer periphery of the roller, rollers mounted in the frame and arranged adjacent the second roller, and teeth alternately arranged in the outer periphery of the last mentioned rollers.

2. In a device of the character described, the combination of a frame, rollers rotatably mounted within said frame, hubs mounted upon one of said rollers, radially projecting cutting knives mounted in said hubs, one half of the knives mounted upon said roller being curved toward one side of the frame and the other half of the knives mounted upon said roller being curved toward the other side of the frame, a second roller arranged in the rear of the first roller, cutting knives arranged in rows upon the outer periphery of said roller, said rows being arranged in a spiral line around said roller, rollers mounted in the rear of the second roller and arranged in spaced relation, and a plurality of teeth alternately arranged in the outer periphery of the last mentioned rollers.

In testimony whereof I hereunto affix my signature in the presence of two witnesses.

ALBERT LARSON.

Witnesses:
E. R. HILL,
FAYE B. HILL.

---

Copies of this patent may be obtained for five cents each, by addressing the "Commissioner of Patents, Washington, D. C."